(12) United States Patent
Jain et al.

(10) Patent No.: US 9,582,258 B2
(45) Date of Patent: Feb. 28, 2017

(54) METHOD AND APPARATUS FOR MANAGING 64-BIT REGISTRY KEYS USING A 32-BIT INSTALLER

(75) Inventors: Akshat Kumar Jain, Noida (IN); Ramesh Kumar Rathour, Ghaziabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 916 days.

(21) Appl. No.: 13/410,904

(22) Filed: Mar. 2, 2012

(65) Prior Publication Data
US 2013/0232479 A1   Sep. 5, 2013

(51) Int. Cl.
*G06F 9/445*   (2006.01)
(52) U.S. Cl.
CPC ............ *G06F 8/61* (2013.01); *G06F 9/44505* (2013.01)
(58) Field of Classification Search
CPC .................................................. G06F 9/44505
USPC .......................................................... 717/174
See application file for complete search history.

(56) References Cited

PUBLICATIONS

Leslie Gallo; "Developing a 32-bit Installer to Install Plug-ins into 64-bit Applications based on InstallShield"; lotus.com website; Feb. 22, 2011.*
"Windows Registry"; Wikipedia.org website; Mar. 1, 2011.*
"How to add, modify, or delete registry subkeys and values by using a registration entries (.reg) file"; Microsoft(R) support website as captured by the Wayback Machine Internet Archive (archive.org) Feb. 20, 2011.*

* cited by examiner

*Primary Examiner* — Qing Chen
*Assistant Examiner* — Clint Thatcher
(74) *Attorney, Agent, or Firm* — Keller Jolley Preece

(57) ABSTRACT

A computer implemented method and apparatus for creating 64-bit registry keys using a 32-bit installer comprising creating a feature tree for a plurality of 64-bit features, receiving a plurality of features selected for installation, creating 32-bit registry keys for the plurality of selected features, storing the 32-bit registry keys in a 32-bit hive of a memory, synchronizing the selected features in the feature tree to a 64-bit hive and storing a feature list registry of the plurality of features selected for installation.

20 Claims, 7 Drawing Sheets

```
HKEY_LOCAL_MACHINE
+--SOFTWARE
   +--ADOBE
      +--ADOBE ACROBAT
         +--11.0
            +--INSTALLER
               +--X64REGISTRY  (FEATURELIST "FEATUREA FEATUREB
                                                     FEATUREC")
                  |---FEATUREA
                  |    |---HKCU
                  |    |     +---SOFTWARE
                  |    +---HKLM
                  |          +---SOFTWARE
                  |---FEATUREB
                  |    |---HKCU
                  |    |     +---SOFTWARE
                  |    +---HKLM
                  |          +---SOFTWARE
                  +---FEATUREC
                       |---HKCU
                       |     +---SOFTWARE
                       +---HKLM
                             +---SOFTWARE
```

FIG. 6

| BEFORE SYNCHRONIZATION | AFTER SYNCHRONIZATION | |
|---|---|---|
| 32-BIT REGISTRY HIVE | 32-BIT REGISTRY HIVE | 64-BIT REGISTRY HIVE |
| FEATURE A | FEATURE A | FEATURE A |
| FEATURE B | FEATURE B | FEATURE B |
| FEATURE C | FEATURE C | FEATURE C |
| FEATURE D | FEATURE D | |
| FEATURE E | FEATURE E | |
| FEATURE F | FEATURE F | |

FIG. 7

METHOD AND APPARATUS FOR MANAGING 64-BIT REGISTRY KEYS USING A 32-BIT INSTALLER

BACKGROUND OF THE INVENTION

Field of the Invention

Embodiments of the present invention generally relate to software interoperability and compatibility and, more particularly, to a method and apparatus for managing 64-bit registry keys using a 32-bit installer.

Description of the Related Art

Installing new applications is a common task for many computer users. As such, software installation must be easy and uncomplicated. During software installation, a substantial amount of automated procedures occur that do not require user interaction. In an effort to automate as many of these procedures as possible, certain limitations are placed on the types of applications/plug-ins that may be installed e.g., limits are placed on mixing 32-bit applications with 64-bit plug-ins.

When applications are installed on a computer, a registry is created. A registry is a hierarchical structure containing data that is critical for the operation of, for example, WINDOWS® and applications that run on WINDOWS®. The registry is structured in a tree format and each node has a key. Often the presence of a key is all an application requires to run, but sometimes the key may be associated with a value. A hive is a group of keys and values in the registry that has a set of supporting files containing backups of the hive's data. For example, when an application is installed, user specific data is recorded under the HKEY_CURRENT_USER key. Registry entries under this key define user preferences such as application settings, printers, network connections, and the like. In addition, when the application is installed, computer specific data is recorded under the HKEY_LOCAL_MACHINE key. Registry entries under this key define the physical state of the computer, including data about system memory, and installed hardware and software.

Issues arise when a 32-bit application is installed on a computer with 64-bit components. A 64-bit component may be able to run faster and more effectively than a 32-bit component. Many essential applications were created on a 32-bit platform, but as technology has advanced, 64-bit components (or plug-ins) have been developed to work with these 32-bit applications. For example, ADOBE ACROBAT® is a 32-bit application, but supports creation of PDF files from 64-bit applications, such as MICROSOFT OFFICE® applications.

As a general rule, 32-bit applications require 32-bit installers. However, the 64-bit components that are built to work with these 32-bit applications require a 64-bit installer. This is because the 32-bit applications required 32-bit registry keys in a 32-bit hive, while the 64-bit components require 64-bit registry keys in a 64-bit hive. The WINDOWS® Installer is not capable of creating registry keys in 64-bit hive using a 32-bit installer. The WINDOWS® Installer can only create registry keys in 64-bit registry hive using a 64-bit installer.

One solution requires the 32-bit applications to maintain two different installers, namely a 32-bit installer for the 32-bit components, and a 64-bit installer for the 64-bit components. This requires costly development and management of two installers and adds complexity to the user. A user must run a 32-bit installer to install 32-bit components and then run a 64-bit installer to install 64-bit components, thereby making software installation more complicated for the user.

Therefore, there is a need for a method and apparatus for managing 64-bit registry keys using a 32-bit installer.

SUMMARY OF THE INVENTION

Embodiments of the present invention generally relate to a method for creating 64-bit registry keys using a 32-bit installer. The method comprises creating a feature tree for a plurality of 64-bit features. The method then receives a plurality of features selected for installation and creates 32-bit registry keys for the plurality of selected features. These 32-bit registry keys are stored in a 32-bit hive of a memory and then the selected features that are listed in the feature tree are synchronized to a 64-bit hive. A feature list registry comprising a list of the plurality of features that are installed is stored in memory.

One or more embodiments of the invention generally relate to a method for deleting 64-bit registry keys using a 32-bit installer. The method receives a plurality of features selected for deletion and a feature tree for a plurality of 64-bit features. Each feature selected for deletion will be compared to a feature list registry to ensure the feature is currently installed. Each installed feature that is selected for deletion is then compared to the feature tree. If the feature is listed in the feature tree, it is deleted from a 64-bit hive. Features that are installed and have been selected for deletion, but are not found in the feature tree, are deleted from a 32-bit hive and finally, all installed features selected for deletion are deleted from the feature list registry.

BRIEF DESCRIPTION OF THE DRAWINGS

FIG. 6 depicts a diagram of a Feature Tree, according to one or more embodiments;

FIG. 7 depicts a representation of the registry hives before and after synchronization, according to one or more embodiments.

Figure 1:
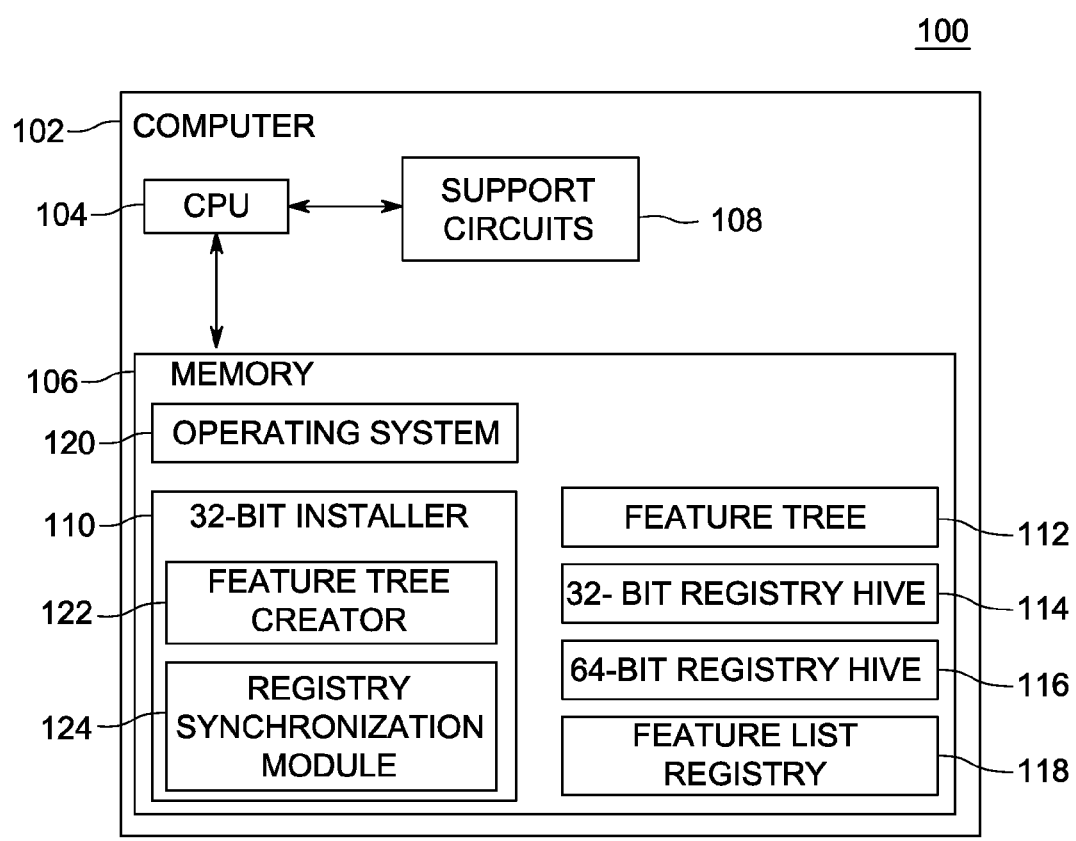
FIG. 1 is a block diagram of a system for managing 64-bit registry keys using a 32-bit installer, according to one or more embodiments.

While the method and apparatus is described herein by way of example for several embodiments and illustrative drawings, those skilled in the art will recognize that the method and apparatus for creating, modifying, and/or deleting 64-bit registry keys by a 32-bit installer is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for creating, modifying, and/or deleting 64-bit registry keys by a 32-bit installer defined by the appended claims. It will be understood by those skilled in the art that claimed subject matter may be practiced using any N-bit installer for creating/modifying/deleting M-bit registry keys. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for managing 64-bit registry keys using a 32-bit installer. The embodiments store all 64-bit components available for installation in a feature tree. When components are selected for installation, 32-bit registry keys are created in a 32-bit hive. 64-bit registry keys are then created in a 64-bit hive for any components that are listed in the feature tree. A list of all installed components is then stored in a feature list. Advantageously, embodiments of the present invention provide installation of both 32-bit components and 64-bit components using only a 32-bit installer.

Various embodiments of a method and apparatus for creating/modifying/deleting 64-bit registry keys using a 32-bit installer are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for creating 64-bit registry keys using a 32-bit installer, according to one or more embodiments. The system 100 comprises a computer 102. The computer 102 comprises a Central Processing Unit (or CPU) 104, a memory 106 and support circuits 108. The CPU 104 may comprise one or more commercially available microprocessors or microcontrollers that facilitate data processing and storage. The various support circuits 108 facilitate the operation of the CPU 104 and include one or more clock circuits, power supplies, cache, input/output circuits, and the like. The memory 106 comprises at least one of Read Only Memory (ROM), Random Access Memory (RAM), disk drive storage, optical storage, removable storage and/or the like.

The memory 106 comprises a 32-bit installer 110, a feature tree 112, a 32-bit registry hive 114, a 64-bit registry hive 116, a feature list registry 118 and an Operating System 120. The operating system 120 may comprise various commercially known operating systems.

The 32-bit installer 110 comprises a feature tree creator 122 and a registry synchronization module 124. The 32-bit installer 110 is capable of managing, i.e., creating, modifying and deleting, 64-bit registry keys for 64-bit features and the 64-bit components thereof for deployment and implementation in cooperation with the 32-bit application software. More specifically, the 32-bit installer 110 is capable of installing the 64-bit components via creation of 32-bit registry keys for the 64-bit components, conversion of the 32-bit registry keys into 64-bit registry keys and storage of the 64-bit registry keys in the 64-bit registry hive 116.

The feature tree creator 122 creates a feature tree. In accordance with embodiments of the invention, the feature tree 112 comprises a list of 64-bit features for the 32-bit application. Further, the feature tree 112 comprises of one or more configuration settings for a current user and one or more configuration settings specific to a local computer.

The registry synchronization module 124 synchronizes one or more features in the feature tree 112 to a 64-bit registry hive 116. The registry synchronization module 124 of the 32-bit installer 110 creates 64-bit registry keys for each 64-bit feature from the 32-bit registry key, stores the 64-bit registry keys to the 64-bit registry hive 116 of the memory 106.

Figure 2:
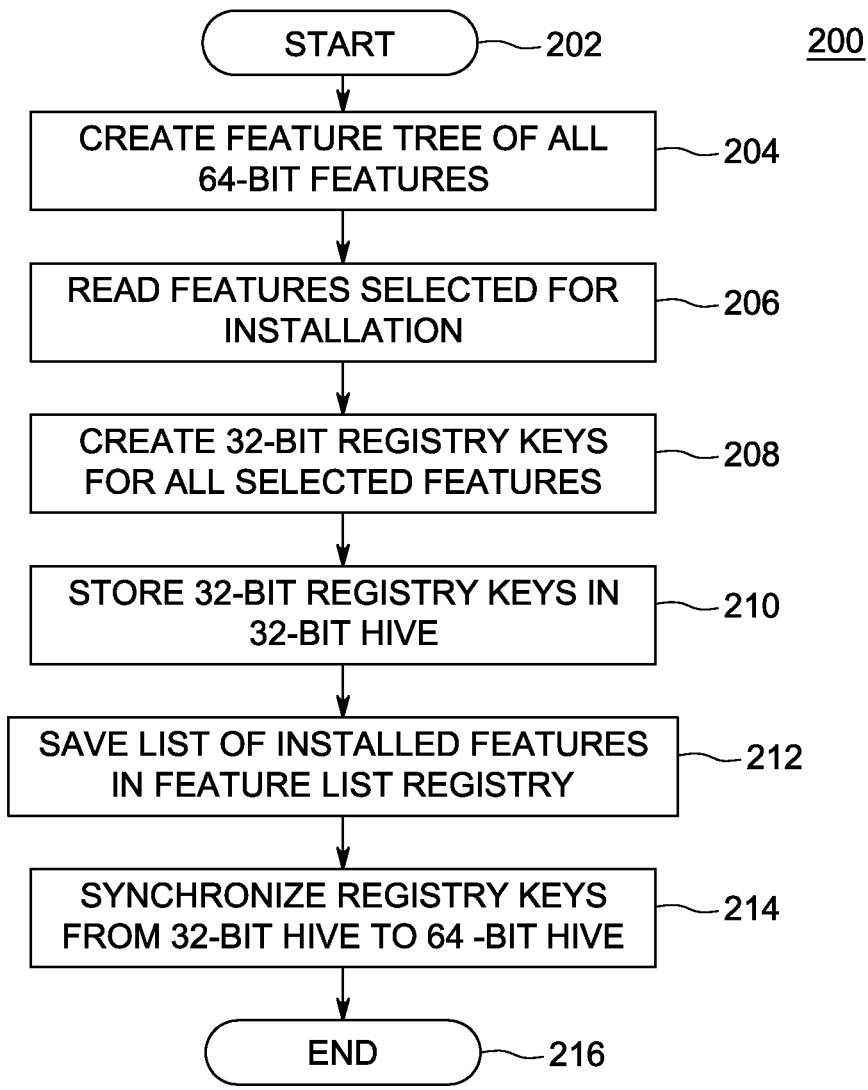
FIG. 2 depicts a flow diagram of a method for installing features as performed by the 32-bit installer of FIG. 1, according to one or more embodiments.

FIG. 2 is a flowchart of a method 200 for installing features as performed by the 32-bit installer 110 of FIG. 1, according to one or more embodiments.

The method 200, according to one embodiment, installs one or more features selected by a user. Specifically, the 32-bit installer creates the feature tree containing all 64-bit features. The feature tree comprises a list of all 64-bit features for a 32-bit application. Further, the feature tree comprises one or more configuration settings for a current user and one or more configuration settings specific to a local computer, as described further in FIG. 6. After the user selects features for installation. The 32-bit installer creates 32-bit registry keys for the features and stores the same in the 32-bit registry hive. The 32-bit installer synchronizes the 32-bit registry keys from the 32-bit registry hive to the 64-bit registry hive. The 32-bit installer saves a list of all installed features in a feature list registry.

The method 200 starts at step 202, and proceeds to step 204. At step 204, the method 200 creates a feature tree containing all 64-bit features as performed by the feature tree creator 122 of FIG. 1. The feature tree contains user settings and local computer settings for all 64-bit features that may be installed with the 32-bit application. Its presence in the feature tree defines the feature as a 64-bit feature. The method 200 proceeds to step 206.

At step 206, the method 200 reads all features selected for installation. Some features may have 32-bit components, while other features may have 64-bit components. The method 200 proceeds to step 208.

At step 208, the method 200 creates 32-bit registry keys for each of the features selected for installation. The method 200 proceeds to step 210.

At step 210, the method 200 stores the 32-bit registry keys in the 32-bit registry hive. The method proceeds to step 212.

At step 212, the method 200 saves a list of all 64-bit installed features in the feature list registry. The feature list registry will be maintained to keep track of all installed features. The feature list registry will be used to ensure that the system does not attempt to remove features that are not currently installed. The method 200 proceeds to step 214.

At step 214, the method 200 synchronizes the 32-bit registry keys from the 32-bit registry hive to the 64-bit registry hive. The feature tree is used to determine which features are 64-bit features and as such, need to be synchronized into the 64-bit hive. The method 200 proceeds to step 216 and ends.

Figure 3:
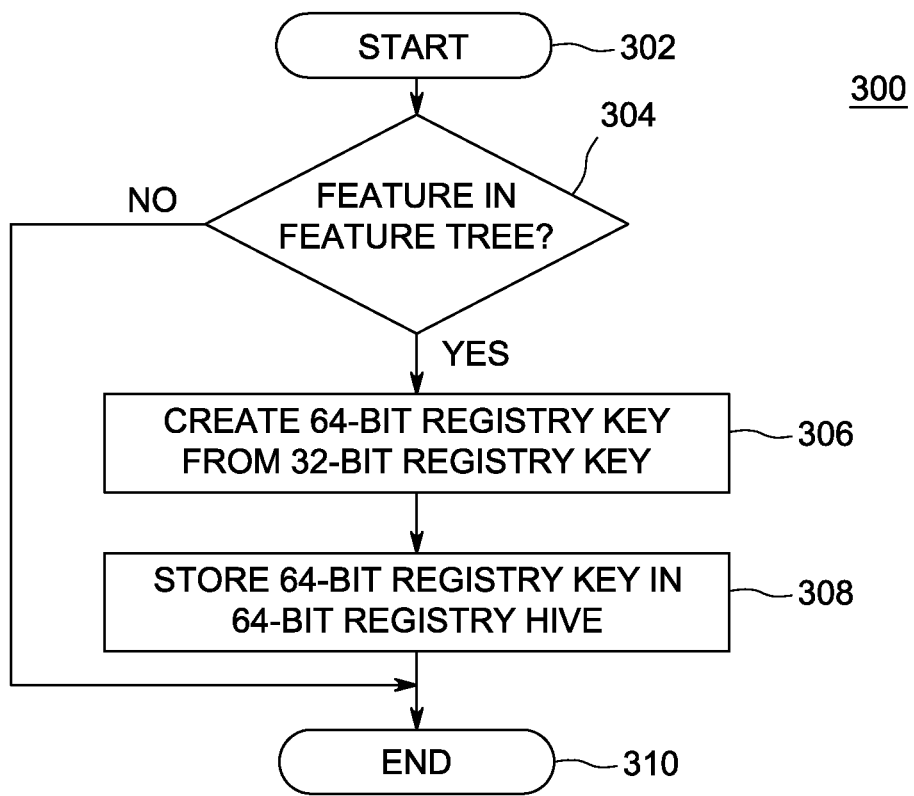
FIG. 3 depicts a flow diagram of the synchronization of registry keys as performed by the registry synchronization module of FIG. 1, according to one or more embodiments.

FIG. 3 is a flowchart of the synchronization of registry keys from FIG. 2. The method 300 represents execution of the registry synchronization module 124 of FIG. 1, according to an embodiment of the invention.

The method 300, according to one embodiment, synchronizes 64-bit features. The 32-bit installer determines whether a feature is a 64-bit feature by looking at the feature tree. If the feature is found in the feature tree, the 32-bit installer creates 64-bit registry keys and stores them in the 64-bit registry hive.

The method 300 starts at step 302, and proceeds to step 304. At step 304, the method 300 determines whether a feature is located in the feature tree. If the feature is not located in the feature tree, the method 300 proceeds to step 310. If the feature is located in the feature tree, the method 300 proceeds to step 306. At step 306, the method 300 creates 64-bit registry keys from 32-bit registry key for each 64-bit feature that is being installed. The method 300 proceeds to step 308.

At step 308, the method 300 stores the 64-bit registry key in 64-bit registry hive. The method 300 proceeds to step 310 and ends.

Figure 4:
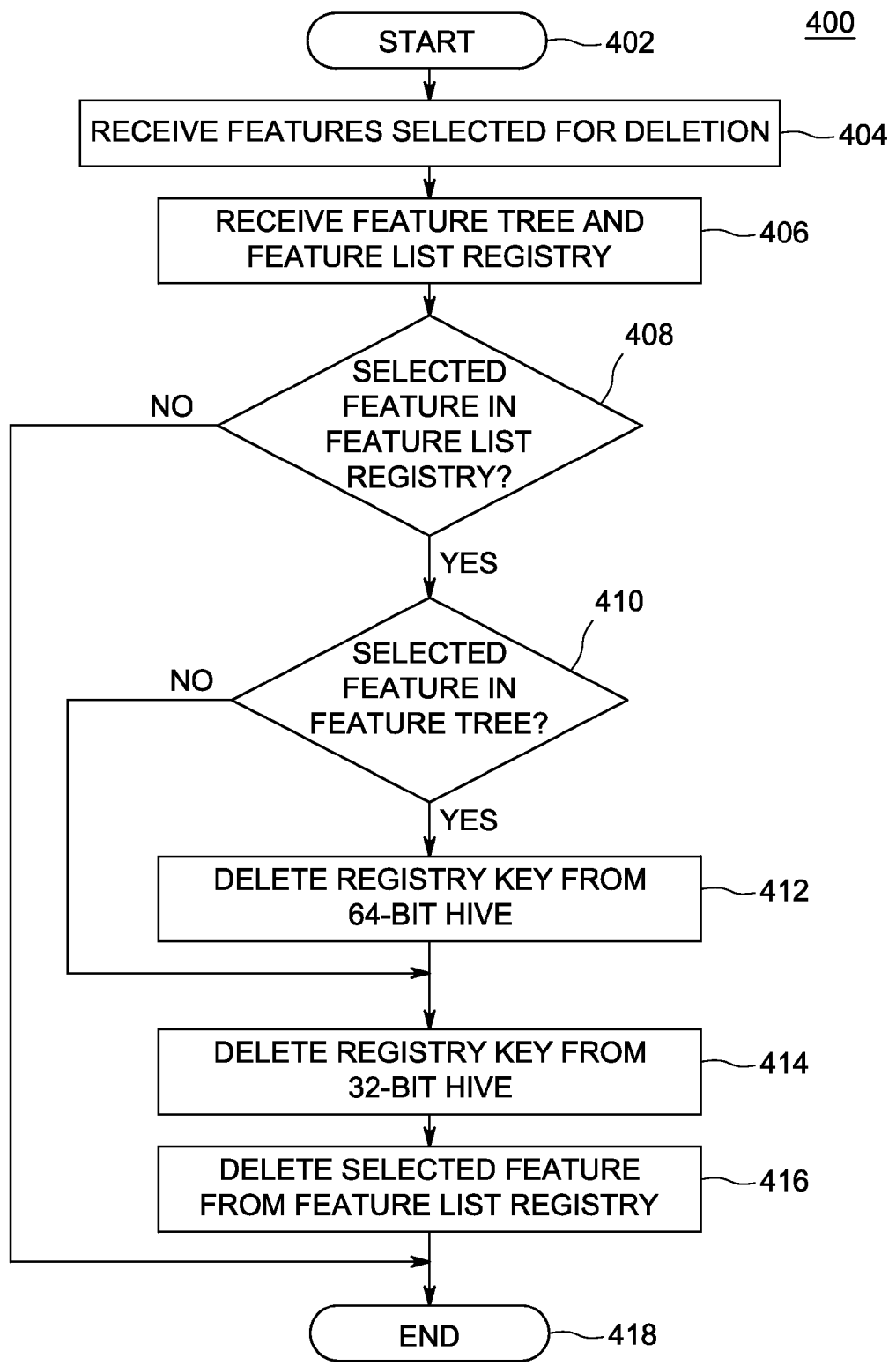
FIG. 4 depicts a flow diagram of a method for deleting installed features as performed by the 32-bit installer of FIG. 1, according to one or more embodiments.

FIG. 4 is a flowchart of a method 400 for deleting features as performed by the 32-bit installer 110 of FIG. 1.

The method 400, according to one embodiment, deletes 64-bit registry keys using the 32-bit installer. As described above, the feature tree comprises a list of 64-bit features for a 32-bit application. The method 400 starts at step 402, and proceeds to step 404. At step 404, the method 400 receives one or more features, i.e., 32-bit and/or 64-bit, selected for deletion by a user. The method 400 proceeds to step 406.

At step 406, the method 400 receives the feature tree and the feature list registry. The method 400 proceeds to step 408.

At step 408, the method 400 determines whether the selected feature is contained in the feature list registry. This will avoid an error should the method 400 attempt to delete a registry key for a feature that is not currently installed. If the selected feature is not found in the feature list registry, meaning the feature is not currently installed, the method 400 proceeds to step 418 and ends. If the feature is found in the feature list registry, the method 400 proceeds to step 410. At step 410, the method 400 determines whether the selected feature is contained in the feature tree. Any features that are located in the feature tree are 64-bit features.

If a selected feature is found in the feature tree, the method 400 proceeds to step 412. At step 412, the method 400 deletes the 64-bit registry key of the selected 64-bit feature from the 64-bit registry hive. The method 400 proceeds to step 414.

If at step 410, the selected feature is not found in the 64-bit feature tree the method 400 proceeds to step 414.

At step 414, the method 400 deletes the registry key for the selected feature from the 32-bit hive. The method 400 proceeds to step 416. At step 416, the method 400 deletes the selected features from the feature list registry. Further, the method 400 updates and saves the list of installed features in the feature list registry. The method 400 proceeds to step 418 and ends.

Figure 5:
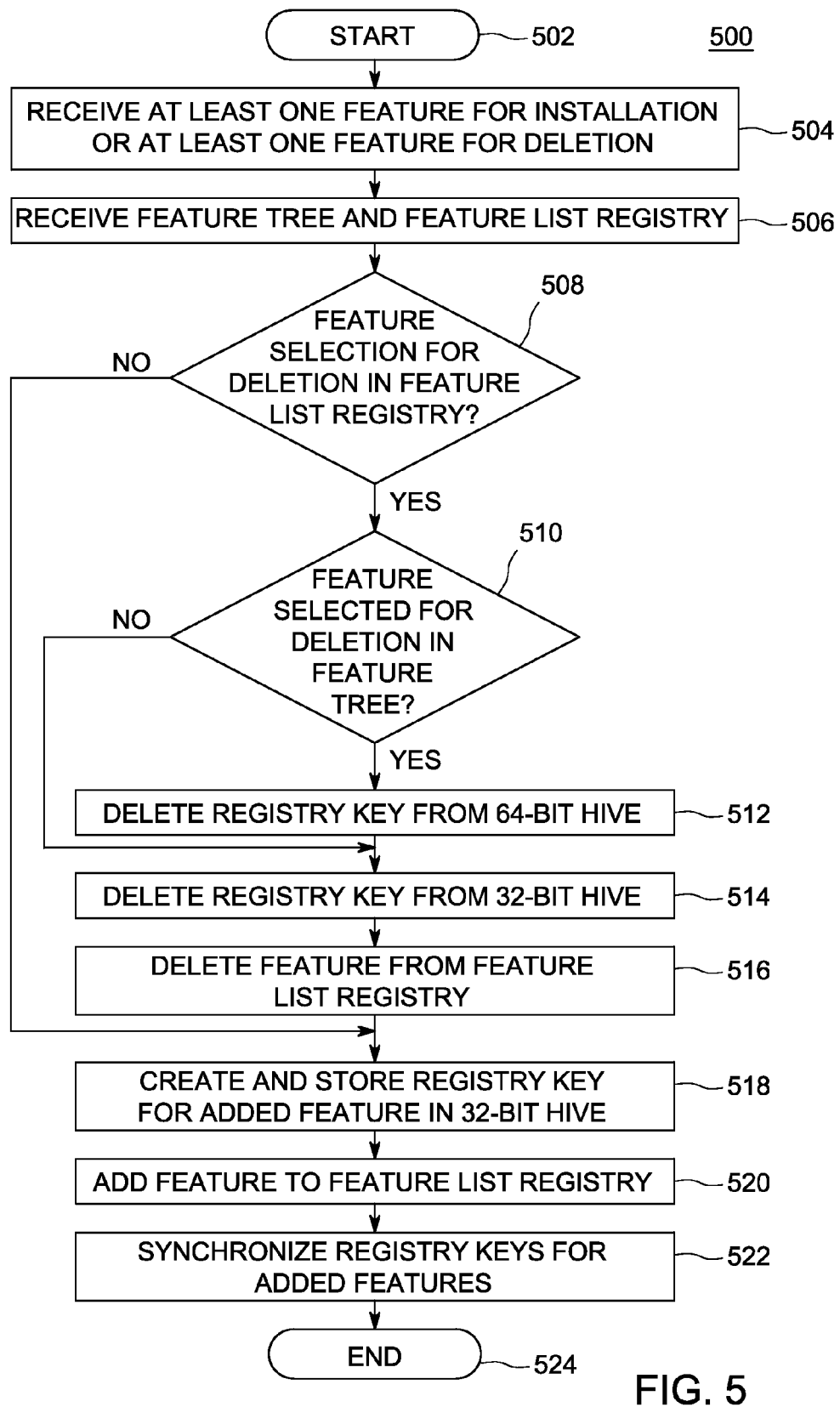
FIG. 5 depicts a flow diagram of a method of modifying which features are installed as performed by the 32-bit installer of FIG. 1, according to one or more embodiments.

FIG. 5 is a flowchart of a method 500 of modifying which features are installed as performed by the 32-bit installer 110 of FIG. 1. The method 500 is a combination of method 400 used for deleting features and method 200 used for adding features.

The method 500 starts at step 502 and proceeds to step 504. At step 504, the method 500 receives at least one feature for installation or at least one feature for deletion. The method 500 proceeds to step 506.

At step 506, the method 500 receives a feature tree for a plurality of 64-bit features and a feature list registry of all installed features. The method 500 proceeds to step 508.

At step 508, the method 500 determines whether the at least one feature selected for deletion is in the feature list registry. This will avoid an error should the method 500 attempt to delete a registry key for a feature that is not currently installed. If the selected feature is not found in the feature list registry, meaning the feature is not currently installed, the method 500 proceeds to step 518. If the feature is found in the feature list registry, the method 500 proceeds to step 510. At step 510, the method 500 determines whether the at least one feature selected for deletion is in the feature tree. If the feature is in the feature tree, the feature is determined to be a 64-bit feature with its registry key in the 64-bit hive and the method 500 proceeds to step 512. At step 512, the method 500 deletes the 64-bit registry key from the 64-bit registry hive. The method 500 proceeds to step 514.

At step 510, if feature selected for deletion is not found in the feature tree, the method 500 proceeds to step 514.

At step 514, the method 500 deletes the 32-bit registry key from the 32-bit registry hive. The method 500 proceeds to step 516.

At step 516, the method 500 deletes the at least one feature selected for deletion from the feature list registry. The method 500 proceeds to step 518.

At step 518, the method 500 creates a 32-bit registry key for each feature selected for installation and stores the 32-bit registry key in the 32-bit registry hive. The method 500 proceeds to step 520.

At step 520, the method 500 adds the installed feature to the feature list registry. The method 500 proceeds to step 522.

At step 522, the method 500 synchronizes the at least one added feature, i.e. a feature selected for installation to a 64-bit registry hive. The method 500 uses the registry synchronization method 300 of FIG. 3. The method 500 proceeds to step 524 and ends.

FIG. 6 is a diagram of a feature tree with features A, B, and C. The feature tree creator 122 of FIG. 1 creates the feature tree. The feature tree contains all 64-bit features that are available for installation. In the feature tree, X64Registry key contains a string value named FeatureList, which is a list of all installed 64-bit features. This information is passed for creation of HKEY_LOCAL_MACHINE key described above. Registry entries under this key define user preferences such as application settings, printers, network connections, and the like. All 64-bit features are listed in the feature tree under X64Registry. Only 64-bit features will be in the feature tree. The 32-bit installer determines whether a feature is a 64-bit feature by looking at the feature tree. If the feature is found in the feature tree, the 32-bit installer creates 64-bit registry keys and stores them in the 64-bit registry hive.

FIG. 7 is a representation of the registry hives during installation, both before and after synchronization. For purpose of illustration, Features A, B, C, D, E, and F have been selected for installation. Features A, B, and C are 64-bit features, while Features D, E, and F are 32-bit features. During installation, 32-bit registry keys are created for each feature and stored in a 32-bit hive in memory. As such, before synchronization, all features, namely Features A, B, C, D, E, and F will have 32-bit registry keys in the 32-bit registry hive. Next, it will be determined which of the features are 64-bit features. If a feature is a 64-bit feature, it will have an entry in the feature tree. 64-bit registry keys will be created for Features A, B, and C because they were found in the feature tree and those 64-bit registry keys will be stored in a 64-bit hive. As shown in FIG. 7, after synchronization, the 32-bit registry keys for Features A, B, C, D, E, and F will be stored in the 32-bit registry hive and the 64-bit registry keys for Features A, B, and C will be stored in the 64-bit registry hive.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 8:
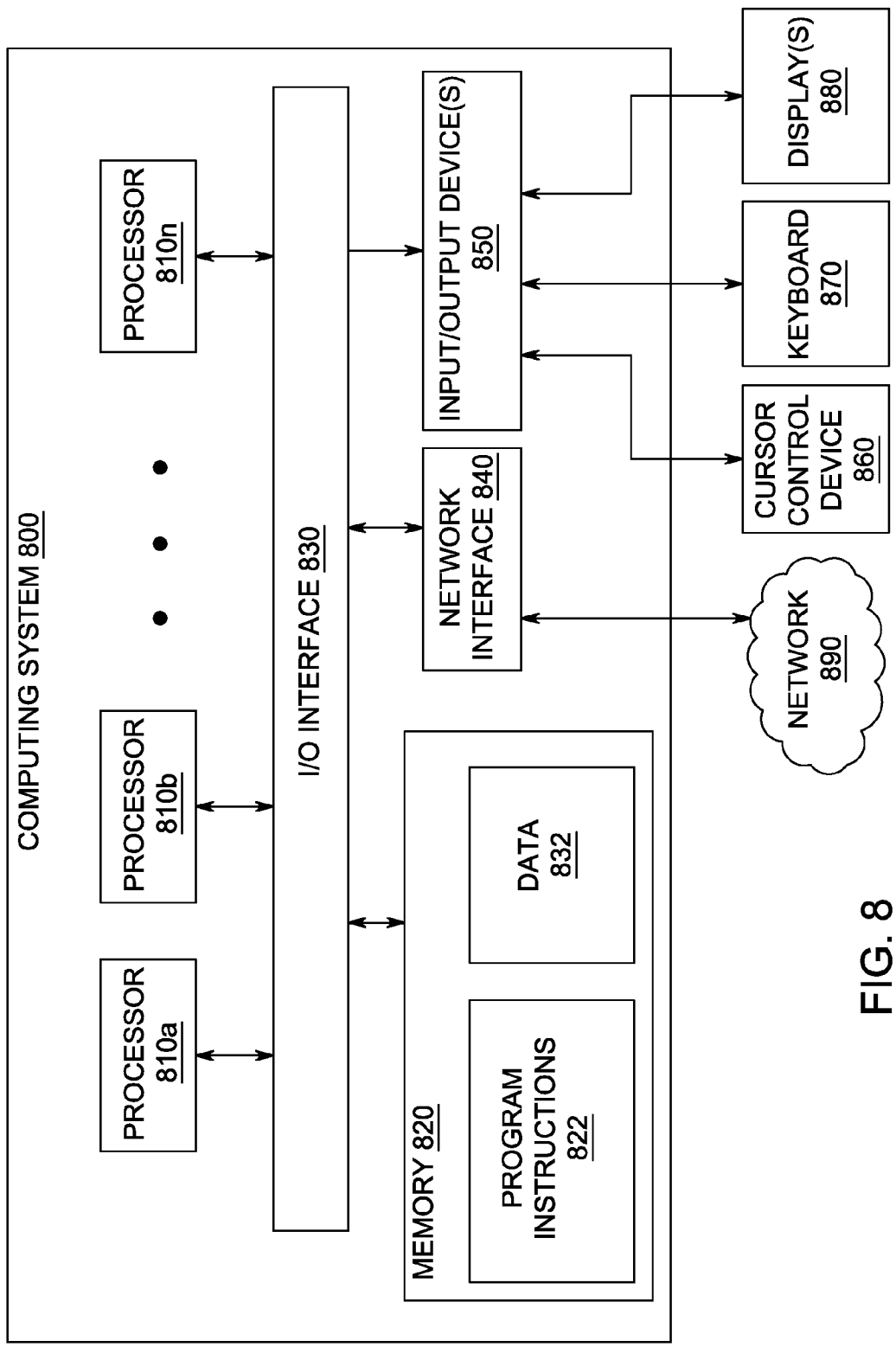
FIG. 8 depicts a computer system that can be utilized in various embodiments of the present invention, according to one or more embodiments.

FIG. 8 depicts a computer system that can be utilized in various embodiments of the present invention, according to one or more embodiments.

Various embodiments of an apparatus and method for managing 64-bit registry keys using a 32-bit installer, as described herein, may be executed on one or more computer systems, which may interact with various other devices. One such computer system is computer system 800 illustrated by FIG. 8, which may in various embodiments implement any of the elements or functionality illustrated in FIGS. 1-7. In various embodiments, computer system 800 may be configured to implement methods described above. The computer system 800 may be used to implement any other system, device, element, functionality or method of the above-described embodiments. In the illustrated embodiments, computer system 800 may be configured to implement methods 200, 300, 400, and 500, as processor-executable executable program instructions 822 (e.g., program instructions executable by processor(s) 810a-n) in various embodiments.

In the illustrated embodiment, computer system 800 includes one or more processors 810a-n coupled to a system memory 820 via an input/output (I/O) interface 830. The computer system 800 further includes a network interface 840 coupled to I/O interface 830, and one or more input/output devices 850, such as cursor control device 860, keyboard 870, and display(s) 880. In various embodiments, any of components may be utilized by the system to receive user input described above. In various embodiments, a user interface (e.g., user interface) may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810*a-n* may be any suitable processor capable of executing instructions. For example, in various embodiments processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810*a-n* may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one components (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowcharts of FIGS. 2, 3, 4 and 5. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of creating registry keys using a 32-bit installer comprising:
   creating a feature tree comprising a plurality of 64-bit features selectable for installation using the 32-bit installer, wherein presence in the feature tree defines a selectable feature as a 64-bit feature;
   receiving a plurality of features selected for installation, wherein at least one feature selectable for installation is a 64-bit feature requiring at least one 64-bit component;
   creating 32-bit registry keys for the plurality of selected features;
   storing the 32-bit registry keys in a 32-bit hive of a memory;
   synchronizing selected features in the feature tree to a 64-bit hive; and
   storing a feature list registry of the plurality of features selected for installation.

2. The method of claim 1, wherein the feature tree comprises a list of all 64-bit features optionally selectable by a user for a 32-bit application, and at least one received feature selected for installation using the 32-bit installer is a 64-bit feature optionally selected by a user.

3. The method of claim 2, wherein the feature tree further comprises a plurality of configuration settings for a current user and a plurality of configuration setting specific to a local computer.

4. The method of claim 1, wherein synchronizing the selected feature comprises determining whether a feature is a 64-bit feature, creating 64-bit registry keys for each 64-bit feature from the 32-bit registry key, and storing the 64-bit registry keys to the 64-bit hive of the memory.

5. The method of claim 4, wherein determining whether a feature is a 64-bit feature comprises finding the 64-bit feature in the feature tree.

6. A computer implemented method for deleting registry keys using a 32-bit installer comprising:
   receiving a plurality of features selected for deletion, including at least one 64-bit feature installed using the 32-bit installer and associated with a plurality of 64-bit registry keys;
   receiving a feature tree for a plurality of 64-bit features, wherein presence in the feature tree defines a feature as a 64-bit feature selectable for deletion;
   deleting registry keys of the selected features based on the feature tree, including the plurality of 64-bit registry keys; and
   deleting the plurality of selected features from a feature list registry.

7. The method of claim 6, wherein the feature tree comprises a list of 64-bit features for a 32-bit application selectable by a user for installation using the 32-bit installer.

8. The method of claim 6, wherein the feature tree further comprises a plurality of configuration settings for a current user and a plurality of configuration setting specific to a local computer.

9. The method of claim 6, wherein deleting the registry keys comprises receiving the feature list registry, verifying the selected feature is installed by reference to the feature list registry, and determining whether the selected feature is listed in the feature tree.

10. The method of claim 9, wherein at least one feature selectable for installation is a 32-bit feature requiring at least one 32-bit component.

11. An apparatus for modifying 64-bit registry keys by a 32-bit installer comprising a computer programmed to implement steps of:
    receiving a feature tree for a plurality of 64-bit features selectable for at least one of installation and deletion using the 32-bit installer, wherein presence in the feature tree defines a selectable feature as a 64-bit feature;
    receiving at least one-feature selected for one of installation and deletion, at least one feature selectable for one of installation and deletion being a 64-bit feature requiring at least one 64-bit component;
    deleting registry keys of any 64-bit feature selected for deletion based on the feature tree;
    creating a 32-bit registry key for the at least one-feature selected for installation;
    storing the 32-bit registry key for the at least one feature selected for installation in a 32-bit hive of a memory;
    synchronizing any 64-bit features selected for installation in the feature tree to a 64-bit hive; and
    adding the at least one feature selected for installation to a feature list registry.

12. The apparatus of claim 11, wherein the feature tree comprises a list of all 64-bit features optionally selectable by a user for a 32-bit application, and wherein at least one feature selected for one of installation and deletion using the 32-bit installer is a 64-bit feature optionally selected by a user.

13. The apparatus of claim 12, wherein at least one feature selected for one of installation and deletion is a 32-bit feature requiring at least one 32-bit component.

14. The apparatus of claim 11, wherein deleting the registry keys comprises receiving the feature list registry, verifying the at least one feature selected for deletion is installed by reference to the feature list registry, and determining whether the selected feature is listed in the feature tree.

15. The apparatus of claim 14, further comprising deleting registry keys for selected features listed in the feature tree from a 64-bit hive.

16. The apparatus of claim 11, wherein synchronizing features selected for installation comprises determining whether a feature is a 64-bit feature, creating 64-bit registry keys for each 64-bit feature from the 32-bit registry key, storing the 64-bit registry keys to the 64-bit hive of the memory, and deleting the 32-bit registry keys from the 32-bit hive for each 64-bit feature.

17. An apparatus for managing registry keys using a 32-bit installer comprising a computer, said computer including:

a 32-bit installer for creating registry keys;

a 32-bit registry hive for storing a plurality of 32-bit registry keys created by the 32-bit installer;

a feature tree comprising a plurality of 64-bit features selectable for installation using the 32-bit installer, wherein presence in the feature tree defines a selectable feature as a 64-bit feature;

a registry synchronization module for synchronizing the plurality of 32-bit registry keys; and a 64-bit registry hive for storing 64-bit registry keys created by the registry synchronization module.

18. The apparatus of claim 17, wherein the synchronization module synchronizes 32-bit registry keys to the 64-bit hive for features found in the feature tree.

19. The apparatus of claim 17, wherein the 32-bit installer deletes registry keys when a feature is uninstalled, wherein deleting the registry keys comprises receiving a feature list registry, verifying the selected feature is installed, and determining whether the selected feature is listed in the feature tree.

20. The apparatus of claim 19, further comprising deleting registry keys for selected features listed in the feature tree from a 64-bit hive.

* * * * *